United States Patent [19]

Samish

[11] Patent Number: 4,980,138
[45] Date of Patent: Dec. 25, 1990

[54] REMOVAL OF $SO_x$ AND $NO_x$ GASES FROM FLUE GAS BY DRY ABSORPTION USING AN ABSORBENT

[75] Inventor: Norman C. Samish, Houston, Tex.

[73] Assignee: Shell Oil Company, Houston, Tex.

[21] Appl. No.: 522,694

[22] Filed: May 14, 1990

[51] Int. Cl.$^5$ .................. B01J 8/00; C01B 21/00; C01B 17/00
[52] U.S. Cl. .................. 423/239; 423/244
[58] Field of Search .............. 423/244 A, 239, 239 A, 423/244 R

[56] References Cited

U.S. PATENT DOCUMENTS

| | | | |
|---|---|---|---|
| 3,498,743 | 3/1970 | Kyllonen | 423/239 |
| 4,009,244 | 2/1977 | Atsukawa et al. | 423/235 |
| 4,048,112 | 9/1977 | Matsushita et al. | 252/461 |
| 4,168,109 | 1/1980 | Atsukawa et al. | 252/440 |
| 4,191,115 | 3/1980 | Yang et al. | 423/244 |
| 4,259,304 | 3/1981 | Steiner | 423/244 |
| 4,372,927 | 2/1983 | McCullough | 423/244 |
| 4,400,363 | 8/1983 | Grochowski et al. | 423/239 |
| 4,469,662 | 9/1984 | Hamada et al. | 423/235 |
| 4,540,553 | 9/1985 | Hagiwara et al. | 423/230 |
| 4,649,034 | 3/1987 | Rutledge | 423/244 |
| 4,710,365 | 12/1987 | Gebhard et al. | 423/244 |
| 4,742,037 | 5/1988 | Baiker et al. | 502/247 |
| 4,789,531 | 12/1988 | Eichholtz et al. | 423/235 |
| 4,789,533 | 12/1988 | Baiker et al. | 423/239 |
| 4,806,319 | 2/1989 | Berg | 423/235 |

OTHER PUBLICATIONS

Satoshi Kudo et al, Dry Flue Gas Desulfurization Process Using Absorbent Made From Flyash, pp. 8-14-1-8-157.
Merryman et al., Reduction of NO in the Presence of Fly Ash, Combustion Science & Technology, 1979, vol. 20, pp. 161-163.

Primary Examiner—Gregory A. Heller
Attorney, Agent, or Firm—Kimbley L. Muller

[57] ABSTRACT

A process is disclosed in which a flue gas from a coal fired burner is treated in a dry phase to remove both $NO_x$ and $SO_x$ which includes $SO_2$ and $SO_3$. This invention provides for use of an absorbent comprising of fly ash, calcium oxide and a hydrated sulfate of calcium to remove the $SO_2$ and/or $SO_3$ component while also incorporating either a high carbon ash, ash derived from a high-vanadium residual oil, iron oxide or iron oxides to remove $NO_x$. Process conditions comprise a temperature in the range of 200° C. to 450° C.

18 Claims, No Drawings

4,980,138

REMOVAL OF $SO_x$ AND $NO_x$ GASES FROM FLUE GAS BY DRY ABSORPTION USING AN ABSORBENT

FIELD OF THE INVENTION

This invention deals with a process to treat flue gas and particularly flue gas from a coal-fired boiler to remove sulfur oxides and nitrogen oxides from fuel gas. Commonly, both sulfur oxides and nitrogen oxides evolve from the combustion of coal or petroleum fractions. Some systems have been previously developed to remove either sulfur oxides or nitrogen oxides from fuel gases but have failed to set forth an easy, low-temperature process for the concomitant removal of both sulfur oxides and nitrogen oxides.

The most commonly emitted and troublesome oxide of sulfur is $SO_2$, although $SO_3$ is also of great concern. Nitrogen forms five separate oxides during combustion. These are $NO$, $NO_2$, $N_2O$, $N_2O_3$ and $N_2O_5$. Mixtures of all of these oxides are present during the combustion of coal. However, NO is the predominant form, comprising over ninety percent of most $NO_x$ emitted.

The field of this invention concerns technology for removal of $SO_2$ and $SO_3$ in conjunction with any of the five above-mentioned oxides of nitrogen in an efficient and systematic process.

BACKGROUND OF THE INVENTION

The technology of this invention is classified in both Class 423 and Class 55. The applicable subclasses in Class 423 are believed to be Subclasses 239 and 244.

In U.S. Pat. No. 4,259,304, issued to Steiner, coal is treated in a sequential manner to provide an absorbent for $SO_2$. The coal is partially oxidized with sulfur dioxide and then activated by contact with superheated steam followed by impregnation with vanadium. The coal is used to remove $SO_2$ from an $SO_2$-containing gas.

Another desulfurization agent is disclosed in Hagiwara et al, U.S. Pat. No. 4,540,553, wherein a hardened product is prepared to act as a desulfurization agent. This hardened product comprises cement which is mixed with limestone or dolomite and is hardened by incorporating water. The process of the patentees utilizes this hardened product in a fluidized bed system to remove $SO_2$ from an $SO_2$-containing stream.

Many catalysts have been developed for the select reduction of nitrogen oxides contained in exhaust gases. Usually these nitrogen oxides are reduced in the presence of ammonia. U.S. Pat. No. 4,048,112 (Matsushita et al) discloses a catalyst for the selective reduction of nitrogen oxides contained in exhaust gases in the presence of ammonia. The catalyst comprises vanadium oxide on a anatase form of $TiO_2$. The vanadium is believed to act as a catalyst to accelerate the reaction of $NO_x$ with ammonia to provide water and nitrogen.

In 1980, U.S. Pat. No. 4,186,109 issued to Atsukawa et al, disclosed a catalyst for the selective reduction of nitrogen oxides prepared by mixing a silicic acid material with a lime material to form a slurry of calcium silicate crystals which is then formed onto a carrier. This catalyst is made to function as a $NO_x$-reduction catalyst in the presence of $SO_x$. It is recognized that $SO_x$-containing combustion gases act to deactivate and choke $NO_x$ decomposition catalysts. While the patentees recognize that titania is a viable carrier for these decomposition catalysts, the cost of titania is extremely high. The patentees' invention provides a lightweight, inexpensive catalyst which is resistant to poisonous constituents such as $SO_x$. The carrier for the particular crystalline calcium silicate may be zirconia, vanadia or titania.

In 1988, at least three patents issued for catalysts for the reductive conversion of nitrogen oxides contained in waste gases. The first of these is U.S. Pat. No. 4,742,037, Baiker et al, which discloses impregnation of a support with a vanadium alkoxide. The resultant catalyst can be used in the presence of sulfur oxides and at temperatures as low as 150° to 350° C. A division of the last patent was issued as U.S. Pat. No. 4,789,533. The latter patent claims the process for converting the nitrogen oxides, while the former patent claims the catalyst for the conversion. Finally, U.S. Pat. No. 4,789,531 to Eichholtz et al discloses a $NO_x$-removal system comprised of an active coke/active carbon and a reducing agent such as ammonia, carbon dioxide or hydrogen. The adsorbent is precharged with the reducing agent to provide for a better system for the removal of nitrogen oxides.

A dry flue gas desulfurization process described by S. Kudo et al was presented at the First Combined Flue Gas Desulfurization and Dry $SO_2$ Control Symposium on Oct. 25–28, 1988 in St. Louis, Mo. In addition to this disclosure, an article was written in *Combustion Science and Technology* by Merryman el al for the reduction of NO in the presence of fly ash. This article can be found at volume 20, pages 161–163.

In Berg, U.S. Pat. No. 4,806,319, a process is disclosed which simultaneously reduces sulfur and nitrogen oxides by contacting those oxides with petroleum pitch. When $SO_2$ and $NO_2$ are mixed with inert gases and contacted with residual fuel oil, asphalt or pitch, the $SO_2$ and $NO_2$ are reduced to compounds which will remain in the petroleum distillate. The inert gases exit from the hydrocarbonaceous material.

In U.S. Pat. No. 4,400,363, a method is described for the removal of sulfur oxides and nitrogen oxides from exhaust gases in a traveling bed which first removes the sulfur oxides and then subsequently, in the presence of ammonia, reduces the nitrogen oxides. This invention requires that the sulfur oxides be removed to have an effective $NO_x$ reduction system in the second part of the exhaust ga reaction.

Hamada et al received U.S. Pat. No. 4,469,662 relating to a process for removing both sulfur and nitrogen oxides in a dry process by passing a waste gas stream through a bed of carbonaceous adsorbent. The sulfur oxides are removed mainly by the carbonaceous adsorbent. The invention is based upon the discovery that carbonaceous adsorbents have a small capacity for adsorbing ammonia, but that carbonaceous adsorbents holding sulfuric acid have an increased capacity for ammonia. Thus, the system is a self-supplied system for removal of both nitrogen and sulfur oxides in a dry process. The process may be conducted from room temperature up to 200° C.

As demonstrated in Atsukawa et al U.S. Pat. No.4,009,244, lime or limestone slurries containing alkali metals or alkaline earth metals have also been used to remove $NO_x$ and $SO_x$ from exhaust gases.

OBJECTS AND EMBODIMENTS

It is therefore an object of this invention to provide a process for further removal of both sulfur and nitrogen oxides in a easy and feasible method.

It is another object of this invention to provide a method for the removal of nitrogen and sulfur oxides at a temperature between 200° C. and 450° C.

It is another object of this invention to provide a method to remove sulfur and nitrogen oxides utilizing materials commonly found in refineries or boiler operations.

In one aspect, an embodiment of this invention resides in a process for removing $SO_x$ and $NO_x$ from a gaseous stream which comprises contacting said gaseous stream with an absorbent comprising flyash, CaO and a hydrated sulfate of calcium wherein said absorbent contains a high-carbon ash, ash derived from a high-vanadium residual oil an iron oxide, iron oxides or combinations of these materials.

Another embodiment of this invention resides in a process for removing $SO_2$ and $NO_x$ from a flue gas stream containing said $SO_2$ and $NO_x$ which comprises contacting said flue gas with a solid absorbent comprising fly ash, lime and gypsum and further containing a $NO_x$-destructive agent selected from the group consisting of high-carbon ash, rust, ash derived from the combustion of high-vanadium residual oil and combinations thereof.

BRIEF DESCRIPTION OF THE INVENTION

Sulfur and nitrogen oxides are removed from a flue gas stream by use of particulate materials containing fly ash, lime and gypsum in addition to either high-carbon ash, iron oxide or iron oxides or the ash derived from combustion of a high-vanadium residual oil.

DETAILED DESCRIPTION OF THE INVENTION

A dry process for the removal of sulfur and nitrogen oxides can be carried out at dry conditions including the absence of water and at a temperature of 200° C. to 450° C. using the absorbent of this invention. This process may be conducted in the presence of ammonia which may be injected into the flue gas stream upstream of the sulfur or nitrogen removal step. Normally, a stoichiometric quantity of ammonia may be injected based upon the quantitative amount of $NO_x$ in the flue gas but other quantities of ammonia are within the scope of this invention.

This invention utilizes a moving-bed reactor as described in S. Kudo et al (previously cited). Flue gas, normally derived from a coal-fired boiler, will pass through the reactor during which $SO_x$ (in the flue gas) reacts with a particulate material in the reactor. The particulate material contains calcium hydroxide in pellet form. From this reaction calcium sulfate is formed. $SO_x$ is thus eliminated from the flue gas.

This invention incorporates a $NO_x$-destruction material to the particulate material used to reduce or eliminate $SO_x$. This material is selected from the group consisting of high-carbon ash, iron oxide or iron oxides and ash derived from combustion of a high-vanadium residual oil combustion. The added components decompose $NO_x$ in the presence of ammonia to produce water and nitrogen gas. One important aspect of this invention is that the combination particulate material be relatively inexpensive. The particulate material is utilized on a once-through basis. It does not qualify economically for regeneration. As a result, the used particulate materials, generally in the form of pellets, can be used as groundfill material, road base or road repair material. The $SO_2$ and $SO_3$ removal is carried out by the function of the fly ash and lime.

The fly ash is derived from the combustion of or as a residue from the combustion of a petroleum fraction or coal. Lime is added to the particulate material as a high-calcium hydrate, i.e. limestone or dolomite. It is preferred that the lime be CaO which may also contain proportions of MgO. It may be mined in different locations throughout the United States. The lime may be added in any manner or mixed prior to formulation with the fly ash. It is desirable that these components form the $Ca(OH)_2$ for the conversion of $SO_x$ to calcium sulfate and calcium sulfite.

The $NO_x$ destruction agent can be either a high-carbon ash, iron oxide or iron oxides or ash derived from the combustion of a high-vanadium residual oil. The high-carbon ash can be acquired by controlling the combustion of coal or a petroleum distillate in a manner so that high-carbon is formed in the ash content. This is usually developed by providing more fuel and a smaller amount of oxygen during the combustion of the relevant material. The iron oxide or the iron oxides may be any form of iron mixed with oxides. It is conceivable that the iron oxides could comprise rust mixed in with the fly ash, lime and gypsum to form the adsorbent. It is also feasible that a high-vanadium residual oil can be used to develop a fly ash containing significant parts per million vanadium oxides for ultimate addition to the adsorbent. In such a situation, it is preferred that the vanadium content be between 0.01 and 2.0 percent by weight. It is conceivable that the ash derivable from the combustion of the high-vanadium residual oil be developed by substituting a small amount of the high-vanadium residual oil for a small amount of coal in the coal-fired burner. In this manner, an inexpensive yet efficient particulate material is formed which will coextensively eliminate $SO_2$ and $NO_x$ from flue gases.

The amount of the $NO_x$ destruction agent can vary greatly. It is within the scope of one of reasonable skill in the art to determine the approximate amount of $NO_x$ that will be present in the flue gas and adjust the amount of destruction agent accordingly. The relative quantity of $NO_x$ destruction agent can vary relative to the quantity of $SO_x$ reduction agent. The relative stoichiometric quantity of a $NO_x$ destruction agent, per weight of the particulate material, is as much as 99% and as small as 1%. The relative stoichiometric quantity of $SO_x$ reduction agent, per weight of the particulate material, is as much as 99% and as small as 1%. The particulate material can contain an amount of components which are inert to $SO_x$ and $NO_x$.

I claim:

1. A method for removing $SO_x$ and $NO_x$ from a gaseous stream which comprises contacting said gaseous stream at a temperature in the range of 200° C. to 450° C. with an absorbent comprising from 1 to 99% by weight of fly ash and lime and from 99 to 1% by weight of a material selected from the group consisting of a high-carbon ash, ash derived from combustion of a high-vanadium residual oil, an iron oxide or iron oxides and combinations of these materials.

2. The method of claim 1 wherein said absorbent is present in the form of pellets.

3. The method of claim 1 wherein said absorbent is present in a particulate form and wherein said particulate form contacts said gaseous stream in a moving-bed reactor wherein $SO_x$ and $NO_x$ are removed from said stream and wherein spent absorbent is removed from said reactor.

4. The method of claim 1 wherein said $NO_x$ and $SO_x$ containing gas stream is derived from a coal-fired boiler.

5. The method of claim 1 wherein $SO_x$ comprises $SO_2$ and $SO_3$ and $NO_x$ comprises $NO$, $NO_2$, $N_2O$, $N_2O_3$ and $N_2O_5$.

6. The method of claim 1 wherein said CaO is added as lime.

7. The method of claim 1 wherein said high-carbon ash is derived by burning fuel under conditions sufficient to increase the amount of carbon-ash from said fuel.

8. The method of claim 1 wherein said iron oxides or iron oxide are derived from rust and wherein said high-vanadium residual oil contains from 0.01 to 2.0 percent by weight vanadium.

9. A method of removing $SO_2$ and $NO_x$ from a flue gas stream containing said $SO_2$ $NO_x$ which comprises contacting said flue gas at a temperature in the range of 200° C. to 450° C. with a solid absorbent comprising from 1 to 99% by weight of fly ash and lime and further containing from 99 to 1% by weight of a $NO_x$-destruction agent selected from the group consisting of a high-carbon ash, rust, ash derived from the combustion of high vanadium residual oil and combinations thereof.

10. The method of claim 9 wherein said contact of said absorbent and said flue gas stream is made in a reactor wherein said absorbent is contained in a moving bed of particulate materials and wherein spent absorbent is removed from said reactor after contact with said flue gas stream.

11. The method of claim 9 wherein said $NO_x$ comprises $NO$, $NO_2$, $N_2O$, $N_2O_3$, $N_2O_5$ or mixtures thereof.

12. The method of claim 9 wherein said flue gas is derived from a coal-fired burner.

13. The method of claim 10 wherein $NH_3$ is added to said reactor where said absorbent and said flue gas are contacted.

14. The method of claim 10 wherein said absorbent is present in the form of pellets and wherein said pellets are not regenerated and not used again.

15. The method of claim 14 wherein said pellets are disposed of as land fill or as road base.

16. The method of claim 12 wherein said high-carbon ash is formed by controlling the burning conditions in said coal-fired burner.

17. The method of claim 9 wherein said high-vanadium residual oil contains from 0.01 to 2 percent by weight vanadium.

18. In a method for the removal of $SO_2$ from a flue gas stream which comprises contacting said stream under treatment conditions with a solid absorbent comprising from 1 to 99% by weight of fly ash, lime and gypsum, the improvement which consists of the concomitant removal of $NO_x$ from said stream by adding to the absorbent from 99 to 1% by weight of a compound selected from iron oxide, iron oxides, highcarbon ash and ash derived from the combustion of a high-vanadium residual oil, and of treating said stream with the absorbent at a temperature of 200° C. to 450° C.

* * * * *